(12) United States Patent
Graeuler et al.

(10) Patent No.: US 11,427,245 B2
(45) Date of Patent: Aug. 30, 2022

(54) STEERING SYSTEM ACTUATOR, AND USE OF THE ACTUATOR IN A STEER-BY-WIRE STEERING SYSTEM

(71) Applicant: ZF Friedrichshafen AG, Friedrichshafen (DE)

(72) Inventors: Dirk Graeuler, Belm (DE); Paul Felix Vähning, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 128 days.

(21) Appl. No.: 16/652,450

(22) PCT Filed: Sep. 11, 2018

(86) PCT No.: PCT/EP2018/074358
§ 371 (c)(1),
(2) Date: Mar. 31, 2020

(87) PCT Pub. No.: WO2019/068424
PCT Pub. Date: Apr. 11, 2019

(65) Prior Publication Data
US 2020/0231202 A1 Jul. 23, 2020

(30) Foreign Application Priority Data

Oct. 4, 2017 (DE) ...................... 10 2017 217 631.8

(51) Int. Cl.
*B62D 5/04* (2006.01)
*F16H 25/20* (2006.01)

(52) U.S. Cl.
CPC ......... *B62D 5/0403* (2013.01); *B62D 5/0424* (2013.01); *F16H 25/20* (2013.01);
(Continued)

(58) Field of Classification Search
CPC ............. F16H 25/20; F16H 2025/2037; F16H 2025/2081; B62D 5/0403; B62D 5/0424
See application file for complete search history.

(56) References Cited

U.S. PATENT DOCUMENTS

| | | | |
|---|---|---|---|
| 8,170,826 B2 | 5/2012 | Krammer | |
| 9,021,910 B2 * | 5/2015 | Arlt | B62D 7/226 74/388 PS |

(Continued)

FOREIGN PATENT DOCUMENTS

| | | |
|---|---|---|
| DE | 10 2014 206 934 A1 | 10/2015 |
| DE | 10 2016 200 101 A1 | 7/2017 |

(Continued)

OTHER PUBLICATIONS

International Search Report Corresponding to PCT/EP2018/074358 dated Dec. 13, 2018.
(Continued)

*Primary Examiner* — David M Fenstermacher
(74) *Attorney, Agent, or Firm* — Finch & Maloney PLLC; Jay S. Franklin; Michael J. Bujold

(57) ABSTRACT

An actuator of a steering system having a housing (2), a spindle drive arranged in the housing (2) which includes an axially movable spindle (5) that engages with a spindle nut (6) mounted in a fixed position. The spindle has at least one fastening end (8, 9), and at least one bearing journal (10, 11) arranged and able to move in the housing (2). The journal is connected to the at least one fastening end (8, 9) of the spindle (5), with at least one joint connection component (3, 4) which is arranged outside the housing (2) and is connected to the at least one bearing journal (10, 11). The at least one bearing journal (10, 11, 110) has a constriction (10v, 11v) that forms a flexible zone (122).

11 Claims, 3 Drawing Sheets

(52) U.S. Cl.
CPC ................ *F16H 2025/2037* (2013.01); *F16H 2025/2081* (2013.01)

(56) References Cited

U.S. PATENT DOCUMENTS

| | | | |
|---|---|---|---|
| 9,744,988 B2* | 8/2017 | Nitano | B62D 3/08 |
| 10,787,195 B2* | 9/2020 | Asakura | F16C 35/067 |
| 2008/0184838 A1* | 8/2008 | Hayashi | B62D 5/008 |
| | | | 74/484 R |
| 2011/0220432 A1* | 9/2011 | Bugosh | F16C 27/066 |
| | | | 180/444 |
| 2013/0248280 A1* | 9/2013 | Stamm | F16H 25/2209 |
| | | | 180/444 |
| 2015/0183455 A1* | 7/2015 | Wang | F16C 25/083 |
| | | | 180/444 |
| 2015/0274200 A1* | 10/2015 | Nakamura | B62D 5/0448 |
| | | | 180/444 |
| 2015/0336605 A1* | 11/2015 | Vorwerck | B62D 5/0424 |
| | | | 180/444 |
| 2019/0092378 A1* | 3/2019 | Klank | B62D 5/0424 |
| 2021/0156462 A1* | 5/2021 | Harris | F16H 55/06 |
| 2021/0354745 A1* | 11/2021 | Mattus | B62D 6/10 |

FOREIGN PATENT DOCUMENTS

| | | |
|---|---|---|
| JP | 5072663 B2 | 11/2012 |
| WO | 2016/206864 A1 | 12/2016 |

OTHER PUBLICATIONS

Written Opinion Corresponding to PCT/EP2018/074358 dated Dec. 13, 2018.

* cited by examiner

STEERING SYSTEM ACTUATOR, AND USE OF THE ACTUATOR IN A STEER-BY-WIRE STEERING SYSTEM

This application is a National Stage completion of PCT/EP2018/074358 filed Sep. 11, 2018, which claims priority from German patent application serial no. 10 2017 217 631.8 filed Oct. 4, 2017.

FIELD OF THE INVENTION

The invention relates to an actuator, and to the use of the actuator.

BACKGROUND OF THE INVENTION

From DE 10 2014 206 934 A1 a servomotor, also referred to as an actuator or—for short—a controller, for a rear axle steering system of a motor vehicle has become known. The actuator is fixed centrally on the axle carrier of the motor vehicle and acts simultaneously on the steering of both rear wheels. Thus the actuator is part of the steering system and comprises a spindle drive that consists of a spindle and a spindle nut which is mounted to rotate in the housing and is axially fixed. The spindle nut is driven by an electric motor and brings about an axial displacement of the spindle to one side or the other. The spindle has a threaded section arranged approximately in the middle, with a movement thread that engages with the spindle nut, and two conically shaped spindle ends each of which is connected to a bearing sleeve by way of a threaded sleeve, which bearing sleeves for their part are guided and able to slide in the housing. On the bearing sleeves, also called journals in what follows, are arranged joint forks for connection to a steering linkage. A problem with such actuators can occur if transverse forces act upon the joint forks and hence also on the journals, since the transverse forces can bring about bending moments in the spindle so that parts of the spindle are subjected to elevated loading.

To solve the above problem, in DE 10 2016 200 101 A1 it has already been proposed that the spindle connected to the journals should have a flexible section in order to reduce bending stresses.

SUMMARY OF THE INVENTION

A purpose of the present invention is to provide an alternative actuator such that transverse forces will act as little as possible on the spindle.

The invention embodies the characteristics of the independent claims. Advantageous design features emerge from the subordinate claims.

The invention relates to an actuator of a steering system, in particular a rear axle steering system, comprising a housing, a spindle drive arranged in the housing, such that the spindle drive comprises an axially movable spindle that engages with a spindle nut fitted in an axially fixed position, the spindle having at least one fastening end. At least one axially movable bearing journal arranged in the housing is connected to the at least one fastening end of the spindle. In this case at least one joint connector component, preferably in the form of a joint fork arranged outside the housing, is connected to the at least one bearing journal. In a simple-to-operate actuator the spindle is displaced out of the housing and axially relative thereto. Accordingly, only one bearing journal is used there. In the case of a central regulator or also an actuator that works toward both sides in a steering system, the spindle is displaced axially through the housing toward the left or the right. The spindle is then supported in two slide bearings. The support and connection to the steering system are effected in each case by a bearing journal on the left and on the right. The bearing journals are preferably connected to the spindle by friction and interlock, in particular by screwing to one another. In both cases the housing of the actuator is supported on the auto body.

According to a first aspect of the invention, in such an actuator the at least one bearing journal is provided with a constriction which forms a flexible zone. The term constriction is understood to mean that at least part of the cross-section of a body, such as a tube, is reduced, in other words its diameter is made smaller. That can extend over a certain length or part-section of the body. In other words, the cross-section change can be located at or toward the end of the body. However an area remote from the ends of the tube, for example the middle, can be constricted. This narrowing of the cross-section can be formed for example by a pressure-shaping process. Particularly in the case of solid bodies (such as a massive pipe) one also speaks of a cross-section reduction produced by constriction. For example, one obtains in a cylindrical body (pipe as the solid body) an area or section with a reduced cross-section or diameter. For the body, a smaller cross-section means that it is more flexible in the area concerned. In that way a body can be produced which has lower bend strength in parts, as required.

By virtue of the partially constricted bearing journal a component is obtained which has a "designed bending zone". When bending moments occur which are introduced into the steering due to transverse forces by way of a joint fork, bending is deliberately allowed. In that way stresses are reduced, especially in the edge fiber area, whereby the useful life of the spindle is decisively prolonged since the bending moments are introduced into the bearing journal where they are absorbed and are not imposed upon the spindle itself, or only slightly so. Thus, in an advantageous manner the life of a spindle in an actuator of a steering system can be increased.

In a preferred embodiment the at least one bearing journal is made essentially cylindrical in its end areas, with the flexible part between them. Preferably the end areas are made exactly cylindrical in order to provide a particularly good sliding surface against the slide bearings in the housing of the actuator. Depending on the requirements, the constriction is then formed so as to produce the desired flexible zone. The smaller the cross-section or diameter, the more flexible is the zone. For example, the constriction can have half the cross-section or diameter of the cylindrical end sections of the bearing journal. The constriction can also be cylindrical. Moreover, in the area of the constriction the cross-section or diameter can decrease gradually and, after reaching a minimum, gradually increase again. The end areas can for example each extend over about a third of the length of the bearing journal. The flexible zone with the reduced diameter or cross-section will then also extend over about a third of the total length of the bearing journal. However, the design is not limited to the axial extensions mentioned here.

Preferably, the flexible zone of the at least one bearing journal is located outside or inside a slide bearing of the housing. In both cases, at least in the zero position of the actuator of a steering system, i.e. when the steering angle is zero, the flexible zone is preferably inside the housing. If the flexible zone of the at least one bearing journal is outside the slide bearing, the cylindrical area facing away from the spindle slides in the slide bearing. If the flexible zone is inside a slide bearing, the cylindrical sliding surface is interrupted by the constriction or flexible zone. In the latter case the constriction is less wide, preferably only a few millimeters wide and deep. The width and depth of the constriction depend on the material of which the bearing journal is made, the forces imposed on it, and the direction from which the force acts upon the joint fork and ultimately the bearing journal. That is the source of the bending moments which must be absorbed by the flexible zone of the bearing journal(s).

Preferably, the two cylindrical end areas of the at least one bearing journal have the same cross-section or diameter, or different diameters, such that the cross-section or diameter of the constriction in the flexible zone is smaller than the diameter of the end areas.

In a preferred embodiment the constriction or the flexible zone created by it is in the form of an all-round groove or furrow or notch. In the case of a notch an all-round depression is formed in the surface of the cylindrical bearing journal, for example by machining. The notch can be V-shaped or substantially V-shaped. The notch has a small width, for example of a few millimeters. In the case of a furrow the depression is similar to a notch, which can be U-shaped or substantially U-shaped. The width of the furrow is larger compared with the notch.

Preferably, the groove can be U-shaped or V-shaped, similarly to the furrow or notch. The shape can be seen clearly in a side view or sectioned representation. Examples emerge from the description of the figures. In any case the groove is regarded as a depression with a substantially larger width than the above-mentioned notch or furrow. The groove can have a width of several centimeters. The groove is preferably an annular groove. The cross-section constriction forming the annular groove has a round, preferably semicircular profile worked into the bearing journal. Starting from the end areas of the bearing journal, the cross-section of the bearing journal is continuously reduced and in that way stress peaks in this component are avoided when the bearing journal is subjected to bending stresses due to transverse forces. In a further embodiment the groove is designed such that starting from the first end area the diameter at first decreases gradually and this is followed by a cylindrical area which is concentric with the longitudinal axis of the bearing journal or spindle. This in turn is followed by a converse, gradual increase of the diameter up to the outer diameter of the bearing journal at its second end area. Here too, the groove is between the end areas.

According to a further preferred embodiment, at least at one of its ends the spindle has an all-round notch. The notch forms a slight cross-section reduction or constriction, which provides a flexible zone in the end area of the spindle. Thus, in this area too a controlled bending is permitted in order thereby to reduce the stresses at the end of the spindle. After the notch the spindle merges into a fastening end with a thread for frictional and interlocked connection to bearing journal. The thread extends into the bearing journal, preferably completely. For this the bearing journal has a first threaded blind hole, into which the fastening end of the spindle is screwed. This produces a firm connection between the spindle and the bearing journal.

In a further preferred embodiment, opposite to and coaxial with the threaded blind hole the bearing journal has a second threaded blind hole into which a fixing bolt can be screwed, which bolt connects the joint connection component to the bearing journal by friction and interlock.

According to a further preferred embodiment the end of the bearing journal facing away from the spindle has an annular flange, i.e., an approximately circular disk-shaped, flat contact surface which is braced against a corresponding contact surface of the joint connection component. This connection between the annular flange and the joint connection component, which latter can be in the form of a joint fork, is designed by virtue of the fastening bolt in such manner that it can transmit not only tensile and compression forces in the axial direction but also and in particular bending moments as well, which are caused by oblique or transverse forces. The bending moments result from the introduction of force via the joint connection component, preferably via the joint fork, which is connected to a steering linkage.

According to a further aspect of the invention the actuator of a steering system is preferably used in a steer-by-wire steering system, preferably in a rear axle steering system of a motor vehicle. Since the rear axle steering in a motor vehicle is a safety-relevant system, an increased fracture resistance and a longer life of the spindle and bearing journal as a connection element to further steering components have a particularly advantageous effect. Steer-by-wire steering systems are preferably electro-mechanically driven and have no direct or immediate mechanical connection to the driver's steering-wheel. Steering is enabled by way of one or more actuators, which produce the steering movement by means of electric control signals. Since the steering takes place, as it were, via a cable, one speaks of "steer-by-wire". A faultless function of the actuator of the steering system must therefore be ensured over the entire life of the vehicle. In this, connection "cable" is only to be understood as a synonym since the steering or control signals can also be conveyed via a bus system such as a CAN-bus, or at least in part even by wireless means.

BRIEF DESCRIPTION OF THE DRAWINGS

An example embodiment of the invention is illustrated in the drawing and will be described in greater detail below, so that further features and/or advantages may emerge from the description and/or the drawings, which show.

DETAILED DESCRIPTION OF THE PREFERRED EMBODIMENTS

Figure 1:
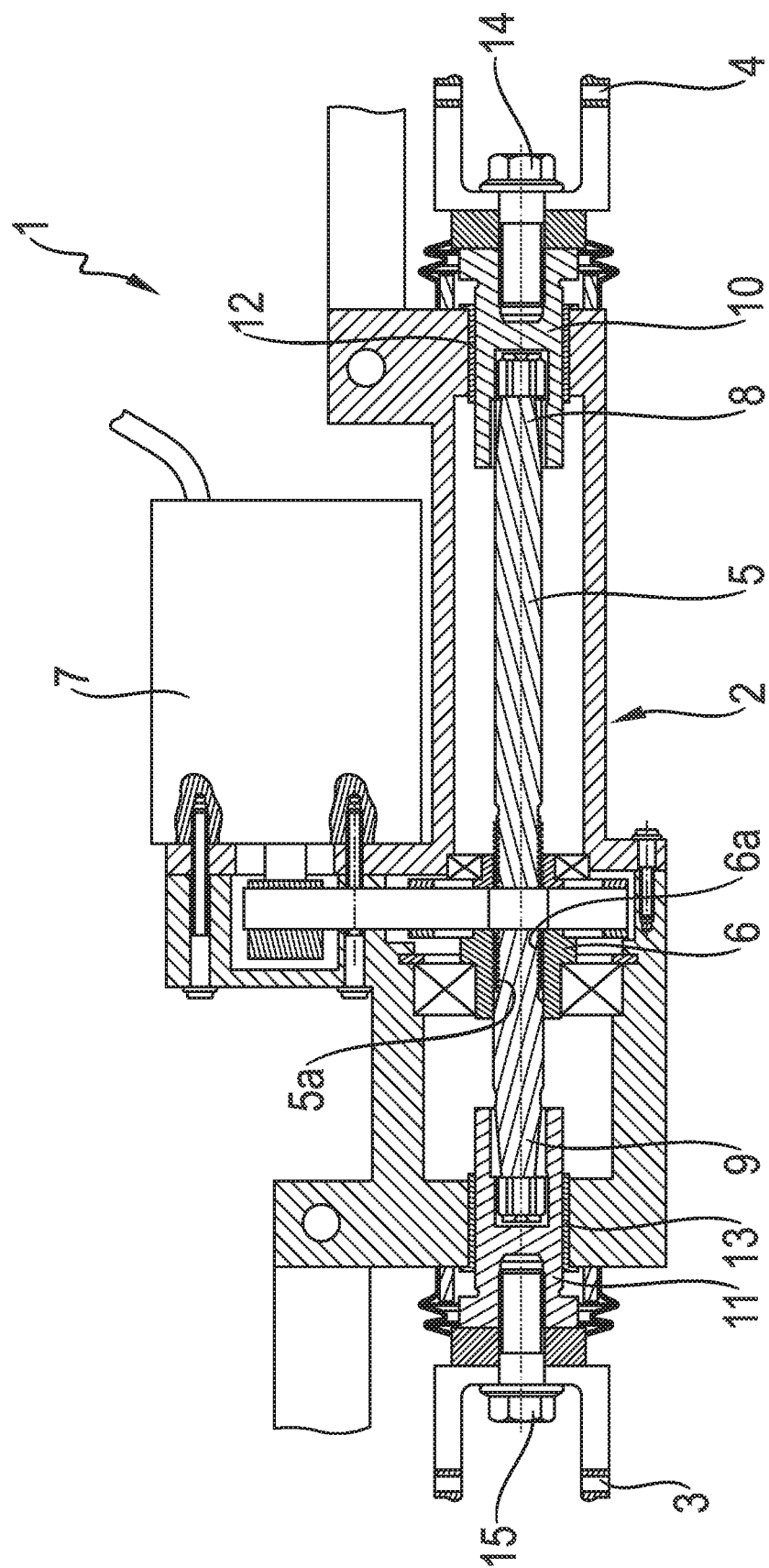
FIG. 1: An actuator of a rear axle steering system for a motor vehicle, according to the prior art

FIG. 1 shows a known actuator 1, also called a servomotor 1, with a housing 2 fixed on an axle carrier of a motor vehicle, and two joint forks 3, 4 arranged diametrically opposite one another, also generally called joint connection components 3, 4, for connecting to track control arms (not shown). The actuator 1 comprises a spindle drive with an axially displaceable (i.e. adjustable) spindle 5 which can be driven via a spindle nut 6 by means of an electric motor 7. In the area of the spindle nut 6, the spindle 5 has a self-locking movement thread 5a in the form of a trapezium thread, which engages with a corresponding internal thread 6a of the spindle nut 6. When the spindle nut 6 rotates, the spindle 5, which is prevented from rotating (in a manner not shown), is caused to move axially (to the left or to the right in the drawing). The spindle has two opposite spindle or fastening ends 8, 9 which, for their part, are connected permanently to bearing journals 10, 11. The bearing journals 10, 11 are guided in the housing in slide bearings 12, 13 and are connected to the two joint forks 3, 4 by respective screw-bolts 14, 15.

Figure 2:
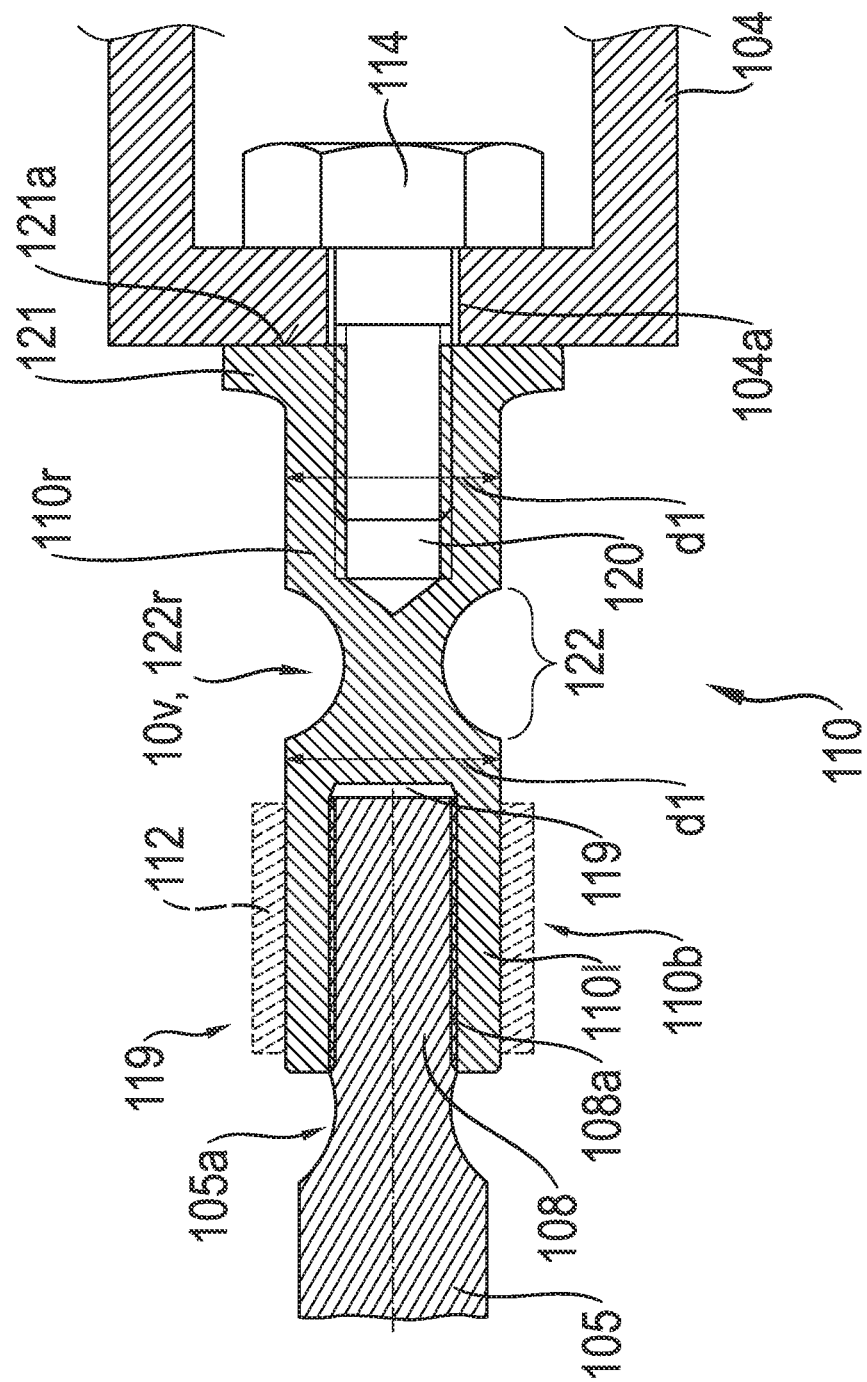
FIG. 2: A detailed view of a bearing journal according to the present invention.

FIG. 2 shows a bearing journal 110 according to the invention, for an actuator of a steering system for a motor vehicle. The same or analogous components in FIG. 2 are denoted by the same indexes as in FIG. 1, but increased by 100. The bearing journal 110 is rod-shaped and has a cylindrical casing 110b which is interrupted by a constriction 10v in the form of an annular groove 122r. The spindle 105 has a fastening end 108 with a thread 108a. A joint connection component 104 in the form of a joint fork 104 is shown in part, i.e. in its fastening area. The joint fork 104 forms the connection to a steering linkage (not shown) for a wheel, for example a rear wheel of the motor vehicle. The joint fork 104 has a through-bore 104a through which a fastening bolt 114 passes.

In the direction toward the spindle 105 the bearing journal 110 has a first threaded blind hole 119 and at the opposite end a second threaded blind hole 120. At its end in the area of the second threaded blind hole 120 the bearing journal 110 has an annular flange 121 with an approximately circular, ring-shaped contact surface 121a. Between the first blind hole 119 or end area 110l and the second threaded blind hole 120 or end area 110r the bearing journal 110 has a flexible zone 122, which compared with the adjacent end areas 110l, 110r has a smaller diameter and a smaller area moment of inertia. The flexible zone 122 is in this case in the form of an all-round annular groove with an approximately semicircular profile, so that a gradual diameter reduction is produced. The bearing journal 110 is connected on one side to the fastening end 108 of the spindle 105 and on the other side by means of the fastening bolt 114 to the joint fork 104. The fastening area 108 is screwed into the first threaded blind hole 119. The spindle 105 has an all-round rounded notch 105a, which also acts as a more flexible part on the spindle. The joint fork 104 is clamped firmly against the contact surface 121a of the annular flange 121 by means of the screw-bolt 114, so that a rigid connection is formed.

Figure 3:
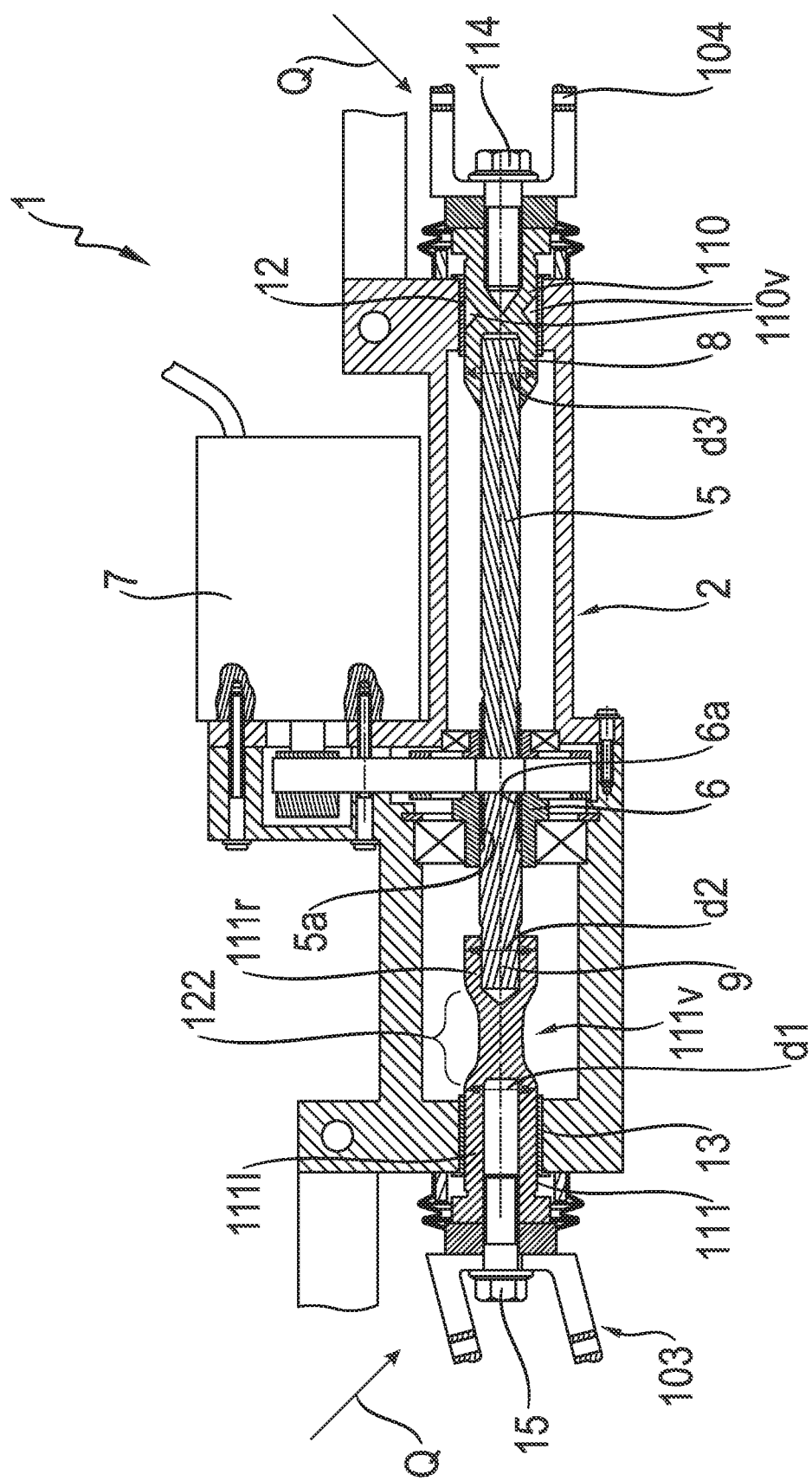
FIG. 3: An actuator of a steering system, according to the invention.

FIG. 3 shows an actuator 1 illustrated in a manner similar to FIG. 1. On the left is shown a bearing journal 111 clamped by means of a screw-bolt 15. The bearing journal 111 has a central area 122 with a smaller diameter compared with the diameters d1 and d2 of the end areas 111l, 111r, which is therefore more flexible compared with the end areas. The cylindrical surface of the end area 111l slides in the slide bearing 13, which is arranged in the housing 2. The end area 111l has a diameter d1 which is larger than the diameter d2 of the end area 111r.

The bearing journal 110 shown on the right in FIG. 3 has a continuous cylindrical outer diameter d3, interrupted approximately in the middle by a V-shaped notch 110v. The bearing journal 110 slides with its cylindrical outer surface in the area to the left and right of the notch 110v in the slide bearing 12, which is arranged in the housing 2 of the actuator 1.

The transverse forces Q shown, act obliquely on the joint forks 103, 104 and produce bending moments on the actuator 1 and thus also on the bearing journals 110, 111, which these can absorb by virtue of the respective constriction 110v, 111v or the flexible zone 122 created thereby, so that the spindle 5 is selectively exposed to substantially less bending stress. The joint fork 103 has a shape with obliquely angled fork ends, in order to allow for the obliquely acting transverse forces Q.

INDEXES

1 Actuator
2 Housing
3 Joint fork
4 Joint fork
5 Spindle
6 Spindle nut
6a Trapezium thread
7 Electric motor
8 Spindle end
9 Spindle end
10 Bearing journal
11 Bearing journal
12 Slide bearing
13 Slide bearing
14 Screw-bolt
15 Screw-bolt
103 Joint fork
104 Joint fork
104a Through-bore
105 Spindle
105a Notch
108 Fastening end, spindle end
108a Thread
110 Bearing journal
110l End area
110r End area
110v Constriction
111 Bearing journal
111l End area
111r End area
111v Constriction, notch
112 Slide bearing
114 Screw-bolt
119 First threaded blind hole
120 Second threaded blind hole
121 Annular flange
121a Contact surface
122 Flexible zone
122r Groove, annular groove
Q Transverse force
d1 Diameter
d2 Diameter
d3 Diameter

The invention claimed is:

1. An actuator of a steering system comprising:
a housing,
a spindle drive being arranged in the housing, the spindle drive comprises an axially movable spindle that engages with a spindle nut which is mounted in an axially fixed position,
the spindle having at least one fastening end,
at least one bearing journal being arranged and being axially moveable in the housing,
the at least one bearing journal being rigidly connected to the at least one fastening end of the spindle,
at least one joint connection component being arranged outside the housing and being connected to the at least one bearing journal, and
the at least one bearing journal having a constriction that forms a flexible zone.

2. The actuator according to claim 1, wherein the at least one bearing journal is substantially cylindrically shaped at two end areas, and the flexible zone is formed therebetween.

3. The actuator according to claim 1, wherein the flexible zone of the at least one bearing journal is either outside or inside a slide bearing of the housing.

4. The actuator according to claim 2, wherein the two cylindrical end areas of the at least one bearing journal have a same diameter or different diameters, and a diameter of the constriction, forming the flexible zone, is smaller than the diameter of the two cylindrical end areas.

5. The actuator according to claim 1, wherein the constriction is one of an all-round groove, a furrow and a notch.

6. The actuator according to claim 5, wherein the all-round groove or the furrow or the notch is either U-shaped or V-shaped.

7. The actuator according to claim 5, wherein the all-round groove is in the form of an annular groove.

8. The actuator according to claim 1, wherein at the least at one fastening end, the spindle has an all-round notch and after the all-round notch, the spindle merges into a fastening end which has a thread for frictional and interlocking connection to the bearing journal.

9. The actuator according to claim 1, wherein an end of the bearing journal, facing away from the spindle, has an annular flange on which the spindle is supported against a joint fork.

10. Use of an actuator of a steering system having a housing, a spindle drive arranged in the housing which comprises an axially movable spindle that engages with a spindle nut mounted in a fixed position, the spindle having at least one fastening end, and at least one bearing journal arranged and able to move in the housing, the at least one bearing journal is connected to the at least one fastening end of the spindle, with at least one joint connection component which is arranged outside the housing and is connected to the at least one bearing journal, the at least one bearing journal has a constriction that forms a flexible zone, and the actuator being used in a rear axle steer-by-wire steering system of a motor vehicle.

11. An actuator of a steering system comprising:
a housing,
a spindle drive being arranged in the housing and having an axially movable spindle that engages with an axially fixed spindle nut,
the spindle having opposite first and second fastening ends,
the first fastening end being supported by a first bearing journal and the second fastening end being supported by a second bearing journal such that the spindle is axially movable relative to the housing,
the first bearing journal being connected to a first joint connection component and the second bearing journal being connected to a second joint connection component,
the first and the second joint connection components being arranged outside the housing,
the first bearing journal having a constriction that forms a flexible zone that is axially arranged between the first fastening end of the spindle and the first joint connection component, and
the second bearing journal having a constriction that forms a flexible zone that is axially arranged between the second fastening end of the spindle and the second joint connection component.

* * * * *